United States Patent
Watanabe

(10) Patent No.: US 11,137,068 B2
(45) Date of Patent: Oct. 5, 2021

(54) SHIFT DEVICE

(71) Applicant: KABUSHIKI KAISHA TOKAI-RIKA-DENKI-SEISAKUSHO, Aichi-ken (JP)

(72) Inventor: Hironori Watanabe, Aichi-ken (JP)

(73) Assignee: KABUSHIKI KAISHA TOKAI-RIKA-DENKI-SEISAKUSHO, Aichi-Ken (JP)

(*) Notice: Subject to any disclaimer, the term of this patent is extended or adjusted under 35 U.S.C. 154(b) by 175 days.

(21) Appl. No.: 16/004,842

(22) Filed: Jun. 11, 2018

(65) Prior Publication Data

US 2018/0363775 A1 Dec. 20, 2018

(30) Foreign Application Priority Data

Jun. 20, 2017 (JP) .............................. JP2017-120478

(51) Int. Cl.
*F16H 61/24* (2006.01)
*F16H 59/08* (2006.01)

(52) U.S. Cl.
CPC .............. *F16H 61/24* (2013.01); *F16H 59/08* (2013.01); *F16H 2059/081* (2013.01)

(58) Field of Classification Search
CPC .... F16H 61/24; F16H 59/08; F16H 2059/081; F16H 61/22; G05G 1/10; G05G 5/04; G05G 5/18; G05G 5/06; B60K 2370/126
USPC .......................... 74/473.3, 473.21, 813 L, 553
See application file for complete search history.

(56) References Cited

U.S. PATENT DOCUMENTS

| | | | |
|---|---|---|---|
| 8,196,490 B2 | 6/2012 | Kim | |
| 9,620,309 B2 | 4/2017 | Hoskins et al. | |
| 9,689,489 B2 * | 6/2017 | Baek | F16H 59/0204 |
| 2002/0029951 A1 * | 3/2002 | Beattie | F16H 59/0204 192/220.4 |
| 2002/0080114 A1 * | 6/2002 | Numata | G05G 1/10 345/156 |
| 2008/0185272 A1 * | 8/2008 | Otani | G06F 3/0362 200/318 |
| 2008/0197004 A1 * | 8/2008 | Ishigaki | B60K 37/06 200/336 |
| 2015/0152958 A1 * | 6/2015 | Watanabe | F16H 61/22 74/473.12 |
| 2016/0138704 A1 | 5/2016 | Watanabe et al. | |
| 2017/0074391 A1 * | 3/2017 | Tebbe | F16H 59/08 |
| 2019/0323600 A1 * | 10/2019 | Jiran | F16H 59/08 |

FOREIGN PATENT DOCUMENTS

| | | | | |
|---|---|---|---|---|
| DE | 102007019468 A1 * | 11/2008 | | F16H 61/22 |
| DE | 102010023310 A1 * | 12/2010 | | G05G 9/047 |
| EP | 0748957 A2 * | 12/1996 | | F16H 59/10 |
| JP | H10-103202 A | 4/1998 | | |
| JP | H10-103443 A | 4/1998 | | |

(Continued)

*Primary Examiner* — Joseph Brown
(74) *Attorney, Agent, or Firm* — Roberts Calderon Safran & Cole P.C.

(57) ABSTRACT

A shift device includes: a shift body that is operated so as to be rotated and to change a shift position; and a restriction member provided with a restriction portion, the restriction portion projecting in a rotation axial direction of the shift body, and the restriction member being moved in the rotation axial direction of the shift body so as to restrict rotation of the shift body at the restriction portion.

12 Claims, 8 Drawing Sheets

(56) References Cited

FOREIGN PATENT DOCUMENTS

| | | | |
|---|---|---|---|
| JP | 2790826 B2 | 8/1998 | |
| JP | 2000-309228 A | 11/2000 | |
| JP | 2002052948 A * | 2/2002 | ............. B60K 37/06 |
| JP | 2014156153 A * | 8/2014 | |
| JP | 2015107669 A * | 6/2015 | |
| JP | 2016-094082 A | 5/2016 | |
| JP | 2017-095011 A | 6/2017 | |
| KR | 2012-0139881 A | 12/2012 | |
| WO | WO-2009071080 A2 * | 6/2009 | ............. F16H 59/10 |
| WO | 2015/107592 A1 | 7/2015 | |
| WO | 2017/049051 A1 | 3/2017 | |
| WO | WO-2017118515 A1 * | 7/2017 | ............. F16H 61/22 |
| WO | WO-2018101907 A1 * | 6/2018 | ............. F16H 59/08 |

* cited by examiner

SHIFT DEVICE

CROSS-REFERENCE TO RELATED APPLICATION

This application claims priority under 35 USC 119 from Japanese Patent Application No. 2017-120478 filed Jun. 20, 2017, the disclosure of which is incorporated by reference herein in its entirety.

BACKGROUND

Technical Field

The present disclosure relates to a shift device for a vehicle in which a shift body is rotated to change a shift position of the shift body.

Related Art

In a shift operation device described in the pamphlet of International Publication (WO) No. 2015/107592, a first stopper is moved in a rotation axial direction of a first clutch gear such that a projection of the first stopper restricts rotation of the first clutch gear.

In this shift operation device, the projection of the first stopper projects in a rotation radial direction of the first clutch gear.

SUMMARY

In consideration of the above circumstances, the present disclosure obtains a shift device capable of achieving a reduction in size in a rotation radial direction of a shift body.

A shift device for a vehicle of a first aspect of the present disclosure includes a shift body and a restriction member. The shift body is operated so as to be rotated and to change a shift position. The restriction member is provided with a restriction portion projecting in a rotation axial direction of the shift body, and is moved in the rotation axial direction of the shift body so as to restrict rotation of the shift body at the restriction portion.

A shift device of a second aspect of the present disclosure, in the shift device of the first aspect of the present disclosure, the restriction member is moved to plural movement positions.

A shift device of a third aspect of the present disclosure, in the shift device of either the first aspect or the second aspect of the present disclosure, further includes a rotating member. The rotating member is rotated so as to move the restriction member, and the restriction member engages with the rotating member.

A shift device of a fourth aspect of the present disclosure, in the shift device of the third aspect of the present disclosure, the rotating member includes plural engagement portions. Each of the plural engagement portions is provided at a different position both in a rotation circumferential direction and in a rotation axial direction of the rotating member, and the restriction member is engageable with each of the plural engagement portions.

A shift device of a fifth aspect of the present disclosure, in the shift device of any one of the first aspect to the fourth aspect of the present disclosure, further includes a biasing member that applies a biasing force to the restriction member along the rotation axial direction of the shift body.

In the shift device of the first aspect of the present disclosure, the shift body is operated so as to rotate the shift body and change the shift position of the shift body. Moreover, the restriction member is moved in the rotation axial direction of the shift body such that the restriction portion of the restriction member restricts rotation of the shift body.

Note that the restriction portion of the restriction member projects in the rotation axial direction of the shift body. This thereby enables a reduction in a size of the shift device in a rotation-radial direction of the shift body.

In the shift device of the second aspect of the present disclosure, the restriction member is moved to the plural movement positions. This thereby enables the restriction member to change the rotation-restricted state of the shift body.

In the shift device of the third aspect of the present disclosure, the rotating member is rotated so as to move the restriction member. The restriction member is engaged with the rotating member. This thereby enables the restriction member to be moved with a simple configuration.

In the shift device of the fourth aspect of the present disclosure, the plural engagement portions are provided at the rotating member. Each of the plural engagement portions is disposed at different positions to each other both in the rotation circumferential direction and in the rotation axial direction of the rotating member. Moreover, the restriction member is engageable with each of the plural engagement portions. This thereby enables the restriction member to be moved to the plural movement positions by rotating the rotating member so as to change the engagement portion with which the restriction member is engaged.

In the shift device of the fifth aspect of the present disclosure, the biasing force acts on the restriction member. This thereby enables rattling of the restriction member to be suppressed.

BRIEF DESCRIPTION OF THE DRAWINGS

Exemplary embodiments will be described in detail based on the following figures, wherein.

DETAILED DESCRIPTION

First Exemplary Embodiment

Figure 1:
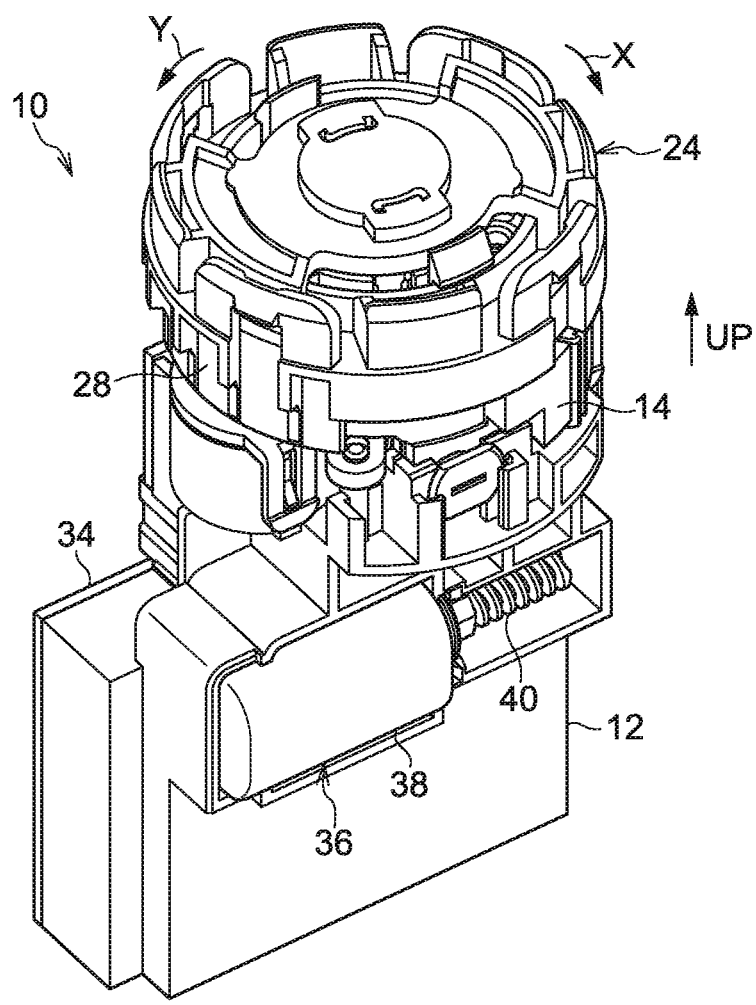
FIG. 1 is a perspective view from an upper side, illustrating a shift device according to a first exemplary embodiment of the present disclosure.
Figure 2:
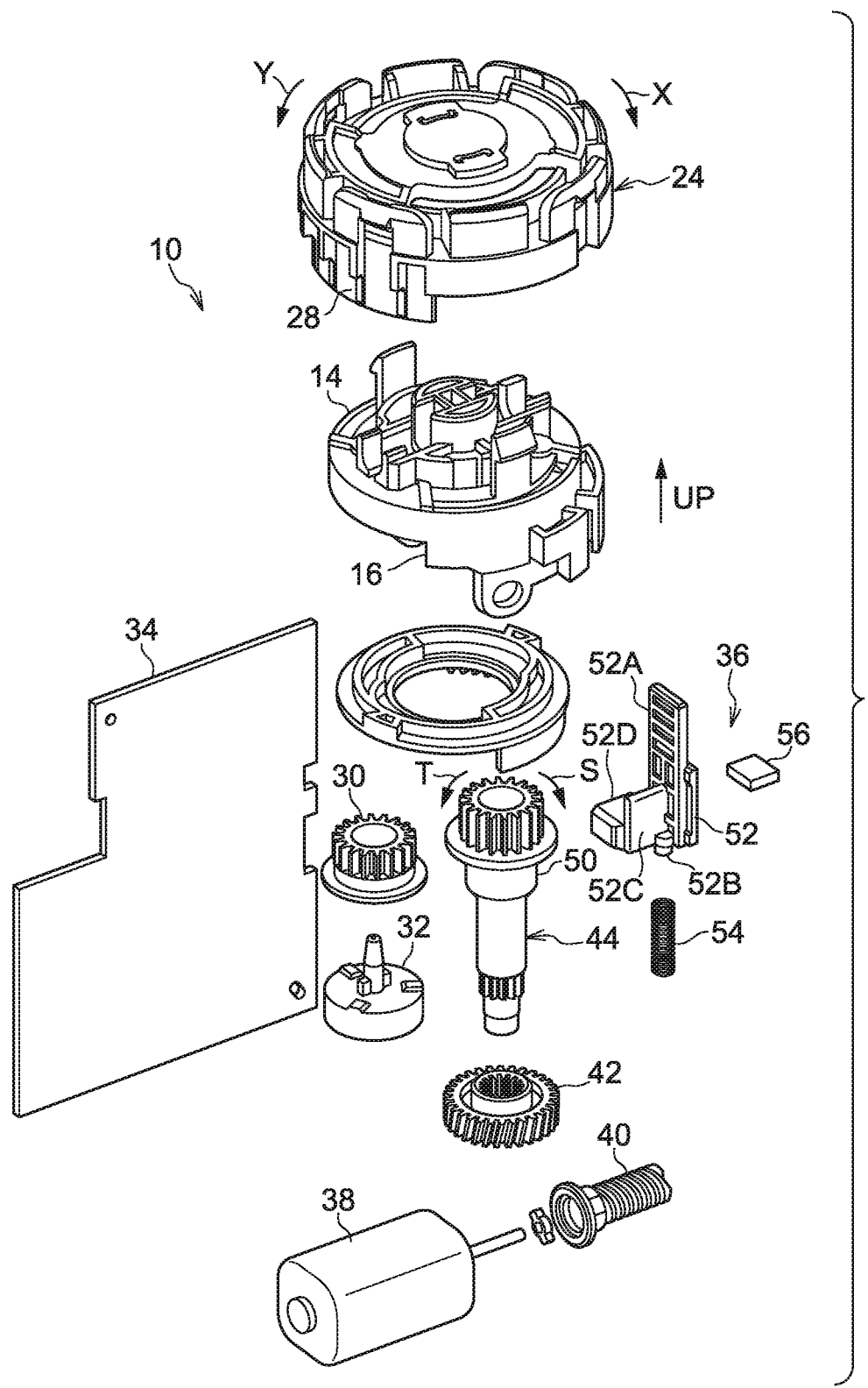
FIG. 2 is an exploded perspective view from an upper side, illustrating a shift device according to the first exemplary embodiment of the present disclosure.

FIG. 1 is a perspective view illustrating a shift device 10 according to a first exemplary embodiment of the present disclosure, as viewed from an upper side. FIG. 2 is an exploded perspective view illustrating the shift device 10 as viewed from the upper side.

Note that in the drawings, an arrow UP indicates an upper side of the shift device 10.

The shift device 10 according to the present exemplary embodiment is installed to a steering column cover (vehicle body side) of a vehicle, and is disposed at a vehicle front side of a driver's seat (not illustrated in the drawings) of the vehicle. An upper side of the shift device 10 faces a right side of the vehicle (or alternatively, a left side of the vehicle).

As illustrated in FIG. 1, the shift device 10 is provided with a substantially rectangular box shaped case 12, serving as an installed member configuring an installed body. The case 12 is installed to the steering column cover, and has an open face on one side.

As illustrated in FIG. 1 and FIG. 2, a plate 14 that has a bottomed substantially cylindrical shape and that serves as a support member configuring the installed body is fixed to an upper side of the case 12. An axial direction of the plate 14 is disposed parallel to an up-down direction, and an interior of the plate 14 is open toward a lower side. A communication hole 16 is formed penetrating a portion of a circumferential wall of the plate 14 in a circumferential direction of the plate 14. The communication hole 16 extends in the circumferential direction of the plate 14, and is open toward the lower side.

Figure 3:
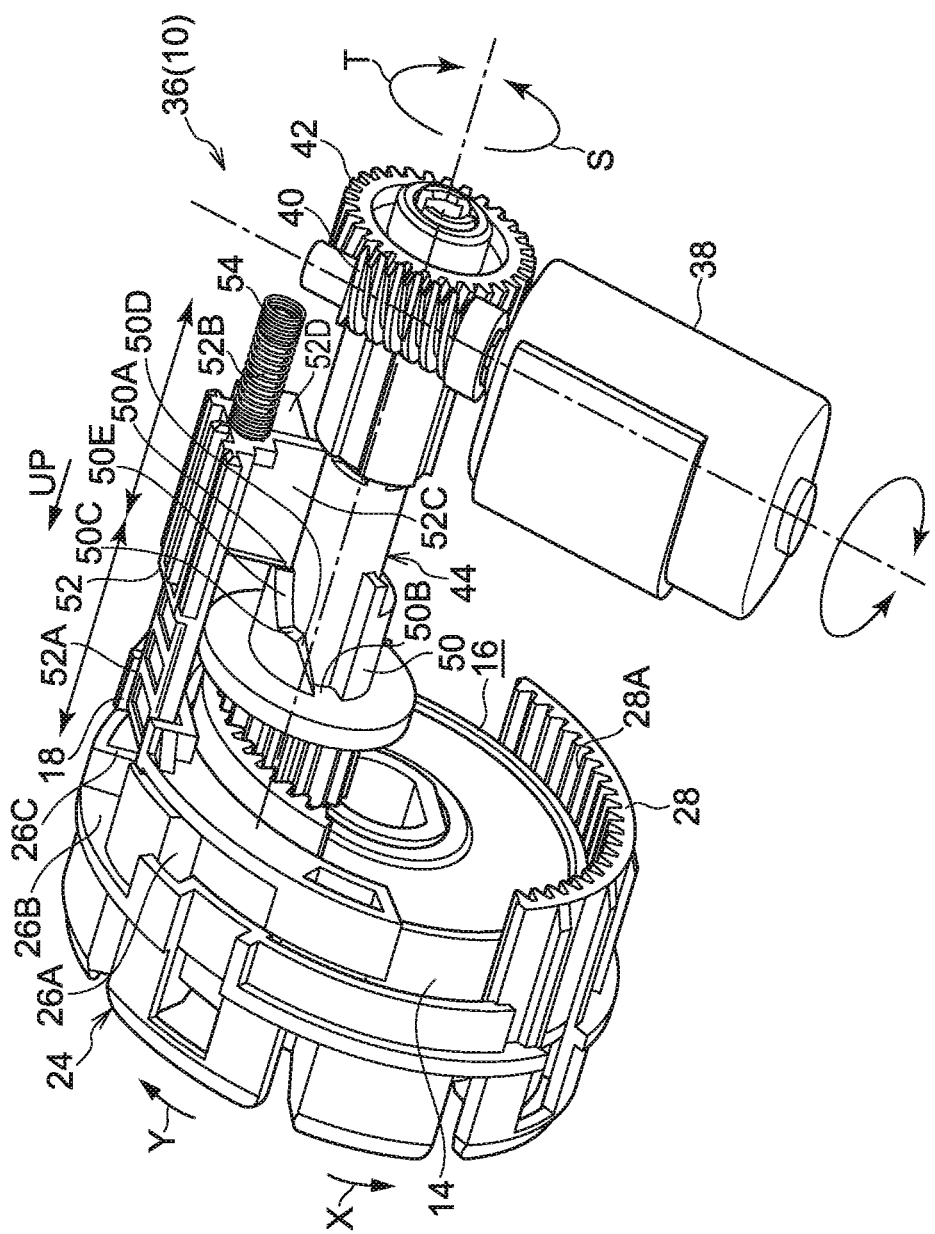
FIG. 3 is a perspective view from a lower side, illustrating a shift locking mechanism of a shift device according to the first exemplary embodiment of the present disclosure.
Figure 4A:
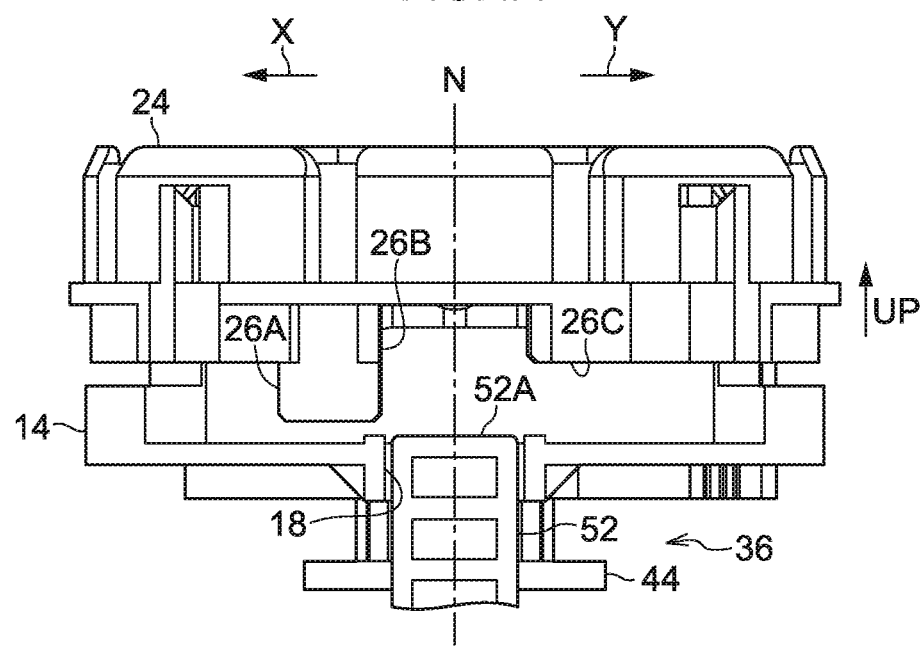
FIG. 4A is a side view illustrating relevant portions of a shift device according to the first exemplary embodiment of the present disclosure.
Figure 4B:
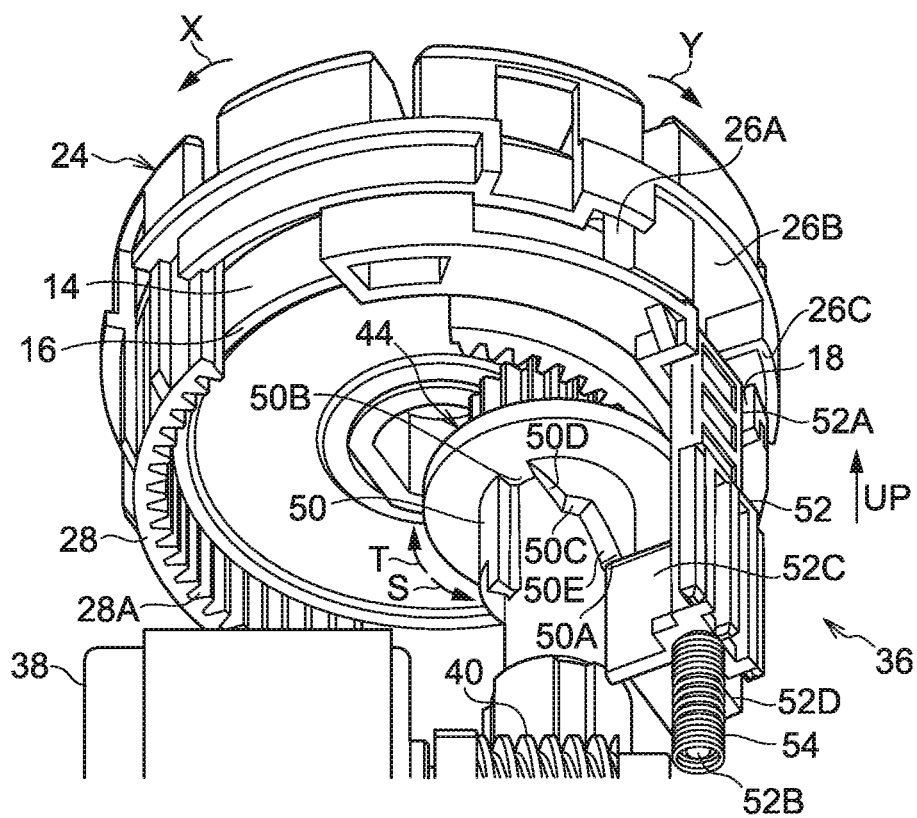
FIG. 4B is a perspective view from a lower side, illustrating relevant portions of a shift device according to the first exemplary embodiment of the present disclosure.

A guide groove 18 with a rectangular cross-section profile, serving as a guide portion, is formed at a lower portion of the circumferential wall of the plate 14 (see FIG. 3, FIG. 4A, and FIG. 4B). The guide groove 18 is disposed at an opposite side with respect to a central axial line of the plate 14 from the communication hole 16. The guide groove 18 extends in the up-down direction, and the guide groove 18 is open at an upper side and a lower side as well as at a radial direction outer side of the plate 14.

A knob 24 (knob base) with a bottomed substantially cylindrical shape, and serving as a shift body, is supported at an upper side of the plate 14. The interior of the knob 24 is open toward a lower side, and the plate 14 is disposed inside the knob 24 so as to be coaxial with the knob 24. The knob 24 is capable of rotating within a predetermined range with respect to the plate 14, and the knob 24 can be rotated by an occupant of the vehicle (in particular, a driver seated in the driver's seat). Shift positions can be changed by rotating the knob 24 in a first direction (the arrow X direction in FIG. 1, etc.) or in a second direction (the arrow Y direction in FIG. 1, etc.). In sequence from a second direction side toward a first direction side, the knob 24 can be placed at a P position (parking position, first shift position), an R position (reverse position), an N position (neutral position, first shift position), and a D position (drive position, second shift position), respectively serving as shift positions.

In sequence from the first direction side toward the second direction side, a P slot 26A, an N slot 26B, and a D slot 26C (see FIG. 4A), these being rectangular as viewed face-on and serving as restricted portions, are formed penetrating a lower side portion of a circumferential wall of the knob 24. The P slot 26A, the N slot 26B, and the D slot 26C are each open toward the lower side. The P slot 26A and the N slot 26B are separated from each other in the circumferential direction of the knob 24, whereas a lower side portion of the N slot 26B and the D slot 26C are in communication with each other in the circumferential direction of the knob 24. When the knob 24 is disposed at the P position, the N position, or the D position, the corresponding P slot 26A, N slot 26B, or D slot 26C faces the guide groove 18 of the plate 14 along the up-down direction (see FIG. 4A, FIG. 4B, FIG. 7, and FIG. 8).

The circumferential wall of the knob 24 is integrally formed with a substantially rectangular plate shaped detector plate 28 (see FIG. 3), serving as a detector. The detector plate 28 is disposed at an opposite side with respect to a central axial line of the knob 24 from the P slot 26A, the N slot 26B, and the D slot 26C, and projects toward the lower side in a curved state following the circumferential wall of the knob 24. An inner peripheral face of the detector plate 28 is formed with detector teeth 28A (inner teeth). The detector teeth 28A are exposed to the interior of the plate 14 through the communication hole 16 in the plate 14.

The detector teeth 28A of the detector plate 28 mesh with a sensor gear 30 (spur gear), serving as a transmission member and configuring a detection mechanism. The sensor gear 30 is rotatably supported at an upper side of the case 12. When the knob 24 is rotated, the detector plate 28 also rotates, and the detector teeth 28A rotate the sensor gear 30.

A substantially circular column shaped magnet 32, serving as a detection member and configuring the detection mechanism, is coaxially disposed at a lower side of the sensor gear 30. The magnet 32 is rotatably supported inside an upper portion of the case 12. The magnet 32 is fixed to the sensor gear 30, such that when the sensor gear 30 is rotated, the magnet 32 rotates as a unit together with the sensor gear 30.

A substantially rectangular plate shaped sensor board 34, serving as a detection section configuring the detection mechanism, is disposed alongside the magnet 32. The sensor board 34 is fixed to the case 12, and the one side face (the open face) of the case 12 is closed off by the sensor board 34. The sensor board 34 is capable of detecting the magnetism of the magnet 32. The sensor board 34 thereby detects a rotation position of the magnet 32 in order to detect the rotation position of the sensor gear 30 and the shift position of the knob 24. The sensor board 34 is electrically connected to a vehicle controller (not illustrated in the drawings), and an automatic transmission (not illustrated in the drawings) of the vehicle is also electrically connected to the controller. When the shift position of the knob 24 is changed, under the control of the controller, the automatic transmission changes to a shift range (a P range (parking range), an R range (reverse range), an N range (neutral range), or a D range (drive range)) corresponding to the shift position of the knob 24.

The shift device 10 is provided with a shift locking mechanism 36 (see FIG. 3), serving as a restriction section.

The shift locking mechanism 36 is provided with a motor 38, serving as a drive section. The motor 38 is fixed to the case 12 such that an axial direction of an output shaft of the motor 38 is disposed perpendicular to the up-down direction. The motor 38 is electrically connected to the controller. A worm gear 40, serving as a first stage gear configuring a drive mechanism, is fixed to the output shaft of the motor 38 so as to be coaxial to and capable of rotating as a unit with the output shaft of the motor 38. The worm gear 40 is rotated when the motor 38 is driven in a positive direction or in a reverse direction.

A helical gear 42 (worm wheel), serving as an intermediate gear configuring the drive mechanism, meshes with the worm gear 40. The helical gear 42 is fixed to a lower portion of a shaft 44, serving as a rotating member configuring the drive mechanism, so as to be coaxial to and capable of rotating as a unit with the shaft 44. The shaft 44 is rotatably supported inside the case 12, and an axial direction of the shaft 44 is disposed parallel to the up-down direction. The shaft 44 projects from the case 12 toward the upper side, and is inserted into the plate 14. When the motor 38 is driven in the positive direction or in the reverse direction, the worm gear 40 is rotated, such that the helical gear 42 and the shaft 44 rotate as a unit in the positive direction (the arrow S direction in FIG. 3, etc.) or the reverse direction (the arrow T direction in FIG. 3, etc.).

A rotating frame 50 that has a C-shaped cross-section profile and that serves as a rotating portion is formed coaxially with the shaft 44 at a circumferential face in the vicinity of an upper end portion of the shaft 44. A lower face of the rotating frame 50 configures a release face 50A, serving as a release portion, and is disposed so as to be perpendicular to the up-down direction. The upper side of a gap between a positive direction side end and a reverse direction side end of the rotating frame 50 is closed off by a first engagement face 50B, serving as an engagement portion. The first engagement face 50B is disposed so as to be perpendicular to the up-down direction. A second engagement face 50C, serving as an engagement portion, is formed at an intermediate portion in the up-down direction of a positive direction side end face of the rotating frame 50. The second engagement face 50C faces toward the lower side, and is disposed so as to be perpendicular to the up-down direction.

A first inclined face 50D, serving as a link portion, is formed at an upper side portion of the positive direction side end face of the rotating frame 50. The first inclined face 50D links the first engagement face 50B and the second engagement face 50C together. The first inclined face 50D is inclined in a direction toward the upper side on progression toward the positive direction side, and the first engagement face 50B is disposed at the positive direction side and upper side of the second engagement face 50C. A second inclined face 50E, serving as a link portion, is formed at a lower side portion of the positive direction side end face of the rotating frame 50. The second inclined face 50E links the second engagement face 50C and the release face 50A together. The second inclined face 50E is inclined toward the upper side on progression toward the positive direction side, and the second engagement face 50C is disposed at the positive direction side and upper side of the release face 50A.

A substantially rectangular plate shaped blocker 52, serving as a restriction member, is provided alongside the shaft 44 at a radial direction outer side of the plate 14. The blocker 52 extends in the up-down direction, and is disposed so as to be perpendicular to a radial direction of the plate 14. The blocker 52 is supported so as to be movable (slidable) in the up-down direction at an upper portion of the interior of the case 12. An upper side portion of the blocker 52 configures a block 52A, serving as a restriction portion, that projects (extends) upward from the case 12. The block 52A is inserted into the guide groove 18 of the plate 14 so as to be capable of moving in the up-down direction, and fits together with the guide groove 18 of the plate 14 along the circumferential direction of the plate 14.

A circular column shaped biasing column 52B is integrally formed to a lower face of the blocker 52. The biasing column 52B extends downward from the blocker 52. The biasing column 52B is inserted inside a lock spring 54 (coil spring), serving as a restriction-biasing section. The lock spring 54 spans between the lower face of the blocker 52 and the interior of the case 12. An axial direction of the lock spring 54 runs parallel to the up-down direction, and the lock spring 54 is compressed such that the lock spring 54 biases the blocker 52 toward the upper side.

Figure 5A:
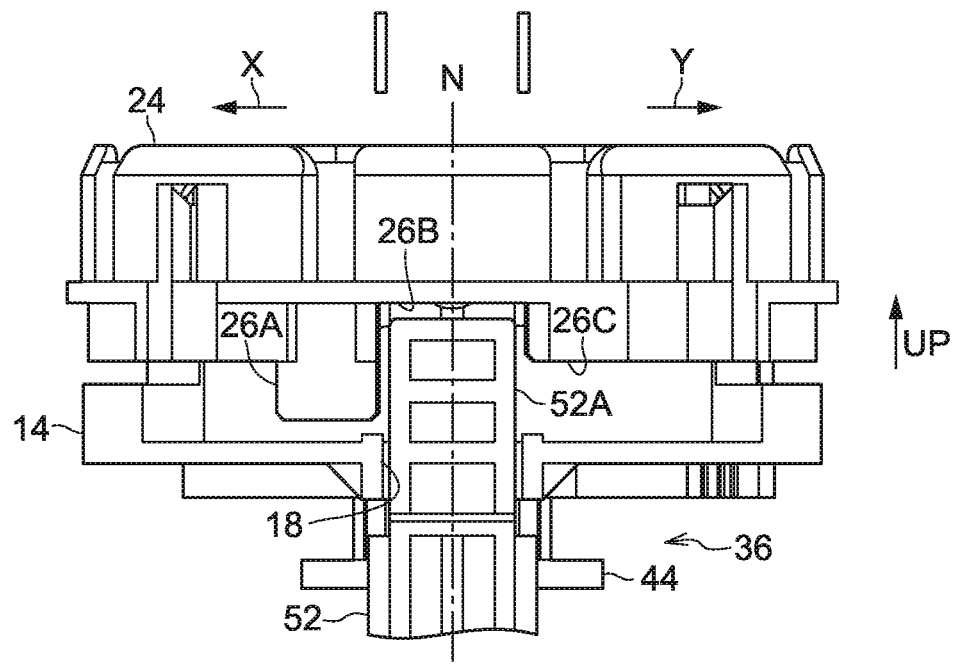
FIG. 5A is a side view illustrating a shift device according to the first exemplary embodiment of the present disclosure when rotation of a knob from an N position is locked.
Figure 5B:
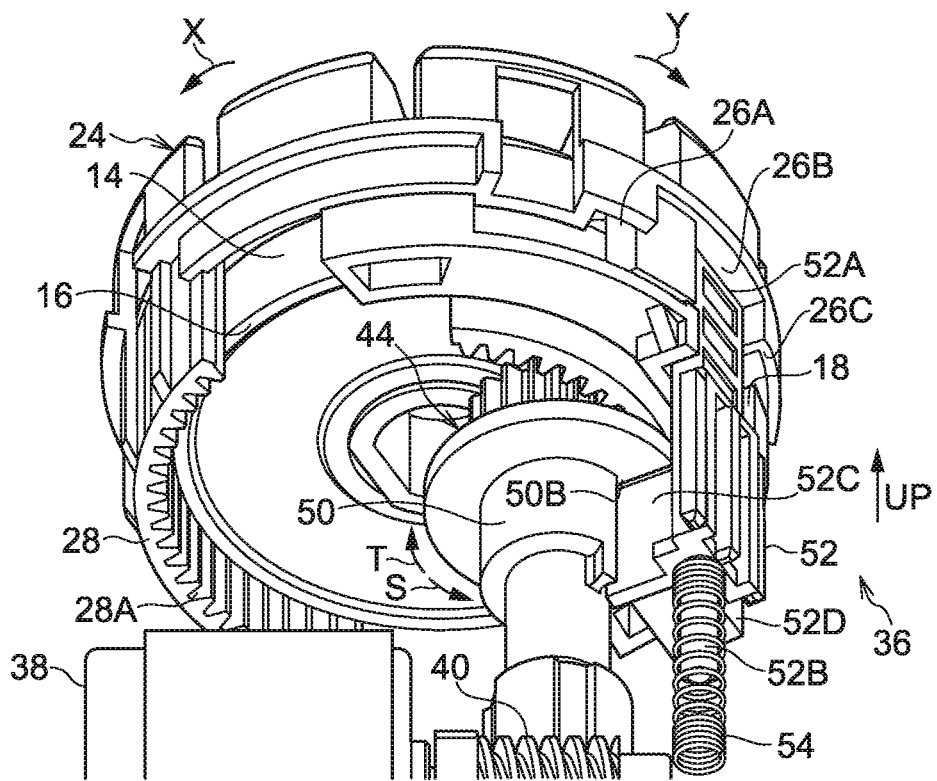
FIG. 5B is a perspective view from a lower side, illustrating a shift device according to the first exemplary embodiment of the present disclosure when rotation of a knob from an N position is locked.
Figure 6A:
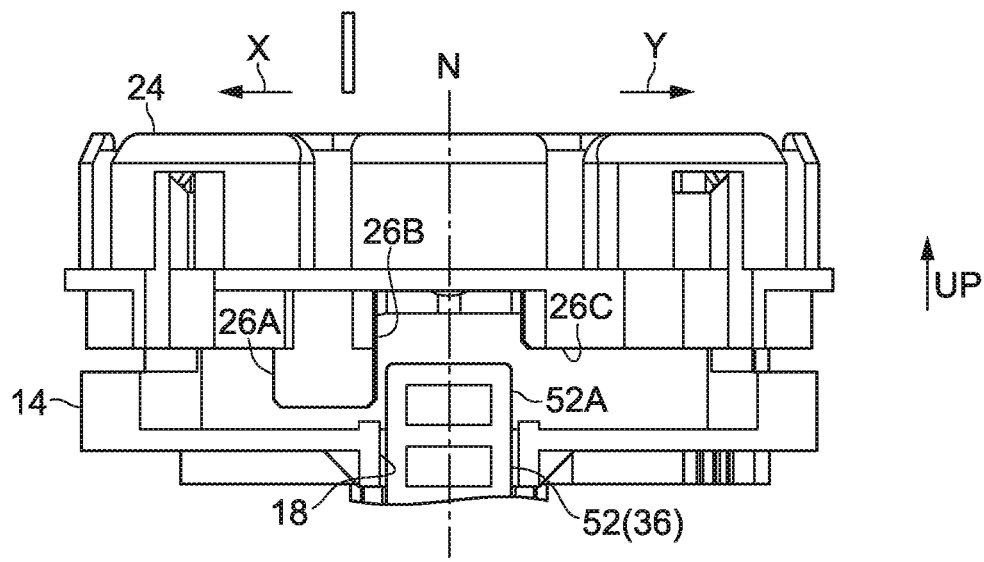
FIG. 6A is a side view illustrating a shift device according to the first exemplary embodiment of the present disclosure when a knob is disposed at an N position and rotation of the knob is locked to within a range from the N position to a D position.
Figure 6B:
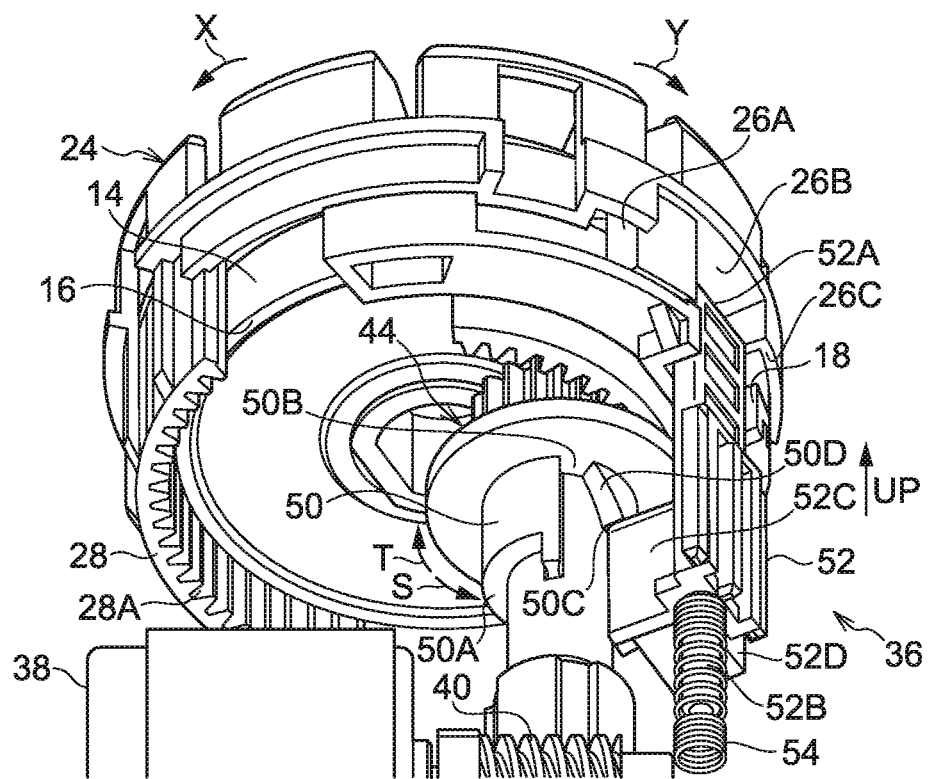
FIG. 6B is a perspective view from a lower side, illustrating a shift device according to the first exemplary embodiment of the present disclosure when a knob is disposed at an N position and rotation of the knob is locked to within a range from the N position to a D position.
Figure 7:
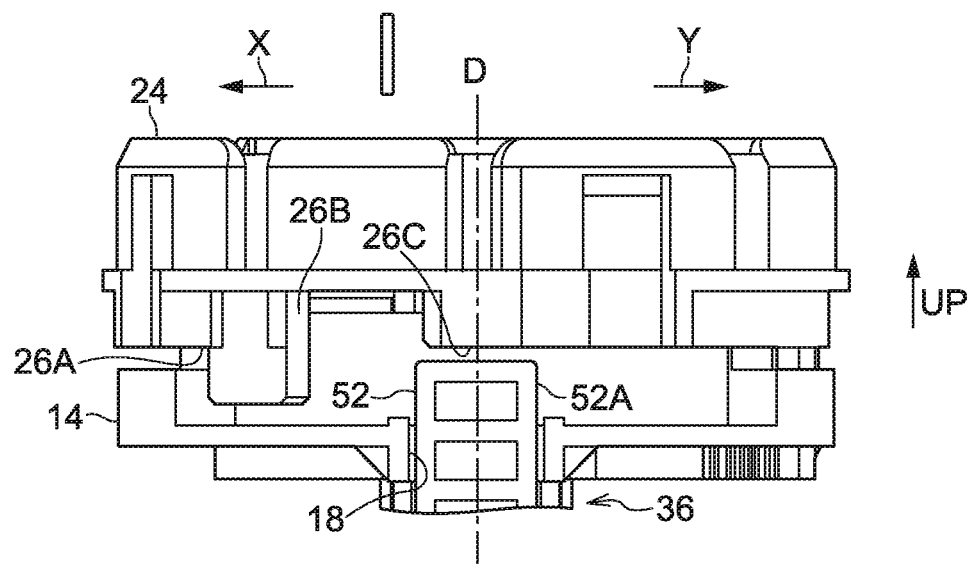
FIG. 7 is a side view illustrating a shift device according to the first exemplary embodiment of the present disclosure when a knob is disposed at a D position and rotation of the knob is locked to within a range from the N position to a D position.
Figure 8:
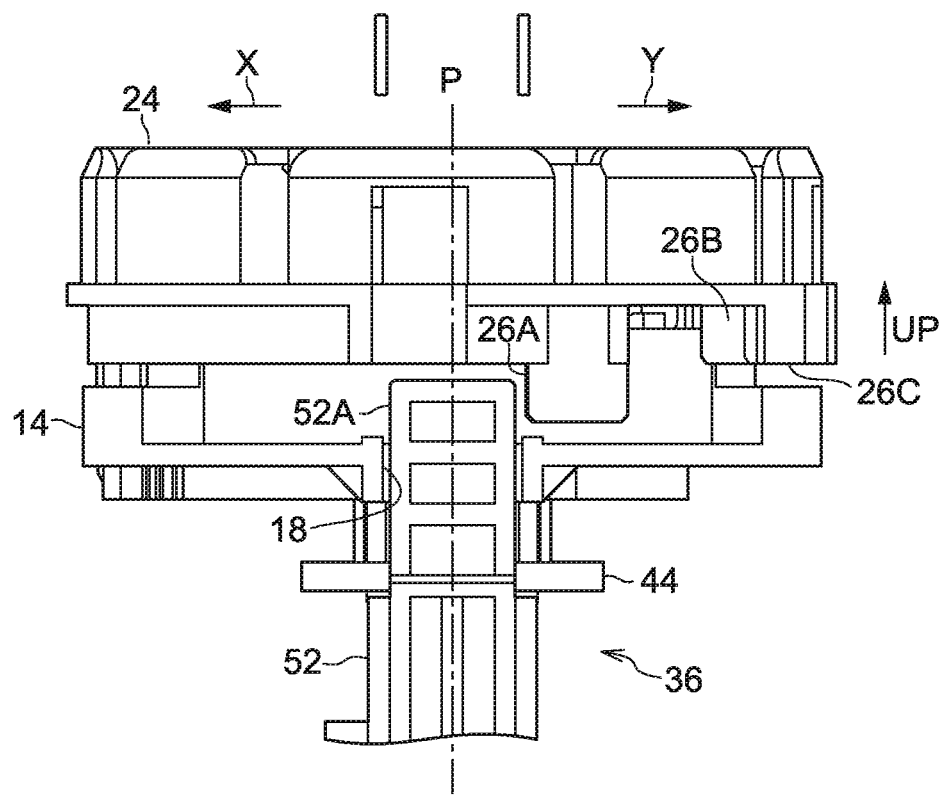
FIG. 8 is a side view illustrating a shift device according to the first exemplary embodiment of the present disclosure when rotation of a knob from a P position is locked.

A lower side portion of a face at the shaft 44 side of the blocker 52 (toward the radial direction inside of the plate 14) is integrally formed with a substantially rectangular plate shaped engagement plate 52C, serving as an engaging portion. The engagement plate 52C projects toward a shaft 44 side. The engagement plate 52C is disposed parallel to the up-down direction and the radial direction of the plate 14, and an upper end face of the engagement plate 52C is curved with a convex profile. The upper end face of the engagement plate 52C engages with (abuts) the release face 50A of the rotating frame 50 of the shaft 44. Accordingly, movement of the blocker 52 toward the upper side under the biasing force of the lock spring 54 is restricted, and the blocker 52 is disposed at a released position at which the block 52A does not project to the upper side from the guide groove 18 in the plate 14 (see FIG. 4A, and FIG. 4B). When the shaft 44 is rotated in the reverse direction, the upper end face of the engagement plate 52C passes the second inclined face 50E and engages with the second engagement face 50C, and the blocker 52 moves toward the upper side, such that the blocker 52 is disposed at a second movement position, at which the block 52A projects from the guide groove 18 toward the upper side (see FIG. 6A, FIG. 6B, FIG. 7, and FIG. 8). Moreover, when the shaft 44 is rotated further in the reverse direction, the upper end face of the engagement plate 52C passes the first inclined face 50D and engages with the first engagement face 50B, such that the blocker 52 moves further toward the upper side, and the blocker 52 is disposed at a first movement position, at which the block 52A projects further toward the upper side from the guide groove 18 (see FIG. 5A and FIG. 5B).

A lower portion of a face on the shaft 44 side of the blocker 52 is integrally formed with a rectangular block shaped fixing box 52D. The fixing box 52D projects toward the side of the shaft 44 and toward the side of the sensor board 34. A lock magnet 56, serving as a restriction detection member, is fixed inside the fixing box 52D by insert molding. The lock magnet 56 is exposed at the sensor board 34 side. The sensor board 34 is capable of detecting the magnetism of the lock magnet 56, and the sensor board 34 thus detects a position in the up-down direction of the lock magnet 56 in order to detect a position in the up-down direction of the blocker 52.

A vehicle brake (not illustrated in the drawings), serving as a restriction release section, is electrically connected to the controller. Operation of the brake by an occupant restricts movement of the vehicle. A lock switch (not illustrated in the drawings), serving as a restriction operation section, is also electrically connected to the controller. The occupant can perform a locking operation (a restriction operation) and an unlocking operation (a restriction-release operation) with the lock switch.

Next, explanation follows regarding operation of the present exemplary embodiment.

In the shift device 10 configured as described above, the shift position of the knob 24 is changed to the P position, the R position, the N position, or the D position by rotating the knob 24.

In cases in which the knob 24 is disposed at the N position (in cases in which the sensor board 34 has detected that the shift position of the knob 24 is the N position) and the lock switch has been lock operated, the motor 38 of the shift locking mechanism 36 is driven in reverse under the control of the controller, such that the shaft 44 is rotated in the reverse direction through the worm gear 40 and the helical gear 42. The upper end face of the engagement plate 52C of the blocker 52 is thus moved from the release face 50A past the second inclined face 50E, the second engagement face 50C, and the first inclined face 50D of the rotating frame 50 of the shaft 44 by the biasing force of the lock spring 54, and engages with the first engagement face 50B (see FIG. 5B). Accordingly, the blocker 52 moves to the first movement position (see FIG. 5A and FIG. 5B), and when the blocker 52 has moved to the first movement position (when the sensor board 34 has detected that the blocker 52 is disposed at the first movement position), the reverse drive of the motor 38 is stopped under the control of the controller. The block 52A of the blocker 52 is thus inserted as far as an upper side portion of the N slot 26B of the knob 24, such that a face at a first direction side and a face at a second direction side of the N slot 26B are abutted by the block 52A. Rotation of the knob 24 from the N position toward the first direction side (D position side) and the second direction side (R position side) is thus locked (restricted).

When the lock switch is unlock-operated, the motor 38 of the shift locking mechanism 36 is driven in positive under the control of the controller, such that the shaft 44 is rotated in the positive direction through the worm gear 40 and the helical gear 42. The upper end face of the engagement plate 52C of the blocker 52 is thus moved from the first engagement face 50B past the first inclined face 50D, the second engagement face 50C, and the second inclined face 50E of the rotating frame 50 against the biasing force of the lock spring 54, and engages with the release face 50A (see FIG. 4B). Accordingly, the blocker 52 moves to the released position (see FIG. 4A and FIG. 4B), and when the blocker 52 has moved to the released position (when the sensor board 34 has detected that the blocker 52 is disposed at the released position), the positive drive of the motor 38 is stopped under the control of the controller. The block 52A is thus no longer inserted into the N slot 26B, permitting the knob 24 to rotate from the N position toward the first direction side and the second direction side.

Moreover, in cases in which the knob 24 is disposed at the N position or the D position (in cases in which the sensor board 34 has detected that the shift position of the knob 24 is the N position or the D position) and the brake is not operated, the motor 38 of the shift locking mechanism 36 is driven in reverse under the control of the controller, such that the shaft 44 is rotated in the reverse direction through the worm gear 40 and the helical gear 42. The upper end face of the engagement plate 52C of the blocker 52 is thus moved from the release face 50A past the second inclined face 50E of the rotating frame 50 of the shaft 44 by the biasing force of the lock spring 54, and engages with the second engagement face 50C (see FIG. 6B). Accordingly, the blocker 52 moves to the second movement position (see FIG. 6A, FIG. 6B, and FIG. 7), and when the blocker 52 has moved to the second movement position (when the sensor board 34 has detected that the blocker 52 is disposed at the second movement position), the reverse drive of the motor 38 is stopped under the control of the controller. The block 52A of the blocker 52 is thus inserted into a lower side portion of the N slot 26B or into the D slot 26C of the knob 24, such that a face at the first direction side of the N slot 26B is abutted by the block 52A. Rotation of the knob 24 toward the second direction side (R position side) is thus locked to within a range from the N position to the D position.

Conversely, in cases in which the knob 24 is disposed at the N position or the D position (in cases in which the sensor board 34 has detected that the shift position of the knob 24 is the N position or the D position) and the brake has been operated, the motor 38 of the shift locking mechanism 36 is driven in positive under the control of the controller, such that the shaft 44 is rotated in the positive direction through the worm gear 40 and the helical gear 42. The upper end face of the engagement plate 52C of the blocker 52 is thus moved from the second engagement face 50C past the second inclined face 50E of the rotating frame 50 against the biasing force of the lock spring 54, and engages with the release face 50A. Accordingly, the blocker 52 moves to the released position, and when the blocker 52 has moved to the released position (when the sensor board 34 has detected that the blocker 52 is disposed at the released position), the positive drive of the motor 38 is stopped under the control of the controller. The block 52A is thus no longer inserted into the N slot 26B or the D slot 26C, permitting the knob 24 to rotate outside of the range from the N position to the D position toward the other direction side (R position side).

Moreover, in cases in which the knob 24 is disposed at the P position (in cases in which the sensor board 34 has detected that the shift position of the knob 24 is the P position) and the brake is not operated, the motor 38 of the shift locking mechanism 36 is driven in reverse under the control of the controller, such that the shaft 44 is rotated in the reverse direction through the worm gear 40 and the helical gear 42. The upper end face of the engagement plate 52C of the blocker 52 is thus moved from the release face 50A past the second inclined face 50E of the rotating frame 50 of the shaft 44 by the biasing force of the lock spring 54, and engages with the second engagement face 50C. Accordingly, the blocker 52 moves to the second movement position (see FIG. 8), and when the blocker 52 has moved to the second movement position (when the sensor board 34 has detected that the blocker 52 is disposed at the second movement position), the reverse drive of the motor 38 is stopped under the control of the controller. The block 52A of the blocker 52 is thus inserted into the P slot 26A of the knob 24, such that a face at the second direction side of the P slot 26A is abutted by the block 52A. Rotation of the knob 24 from the P position toward the first direction side (R position side) is thus locked.

Conversely, in cases in which the knob 24 is disposed at the P position (in cases in which the sensor board 34 has detected that the shift position of the knob 24 is the P position) and the brake has been operated, the motor 38 of the shift locking mechanism 36 is driven in positive under the control of the controller, such that the shaft 44 is rotated in the positive direction through the worm gear 40 and the helical gear 42. The upper end face of the engagement plate 52C of the blocker 52 is thus moved from the second engagement face 50C past the second inclined face 50E of the rotating frame 50 against the biasing force of the lock spring 54, and engages with the release face 50A. Accordingly, the blocker 52 moves to the released position, and when the blocker 52 has moved to the released position (when the sensor board 34 has detected that the blocker 52 is disposed at the released position), the positive drive of the motor 38 is stopped under the control of the controller. The block 52A is thus no longer inserted into the P slot 26A, permitting the knob 24 to rotate from the P position toward the first direction side (R position side).

Note that the blocker 52 is capable of moving along a rotation axial direction of the knob 24 (in the up-down direction), and the block 52A of the blocker 52 projects in the rotation axial direction of the knob 24 (toward the upper side). This thereby enables a reduction in the size of the shift device 10 in a rotation radial direction of the knob 24.

Moreover, the blocker 52 is moved from the released position to the first movement position and the second movement position. This thereby enables rotation of the knob 24 from the N position toward the first direction side and the second direction side to be locked by moving the blocker 52 to the first movement position, and enables rotation of the knob 24 to be locked to within the range from the N position to the D position toward the second direction side, and rotation of the knob 24 from the P position toward the first direction side to be locked, by moving the blocker 52 to the second movement position. This thereby enables the rotation lock mode of the knob 24 to be changed with a simple configuration.

Moreover, the upper end face of the engagement plate 52C of the blocker 52 engages with the release face 50A of the rotating frame 50 of the shaft 44, and the upper end face of the engagement plate 52C is moved from the release face 50A to the second inclined face 50E, the second engagement face 50C, the first inclined face 50D, and the first engagement face 50B by rotating the shaft 44, thereby moving the blocker 52 away from the released position. This thereby enables the blocker 52 to be moved away from the released position by a simple configuration. Moreover, the shaft 44 is disposed at the inner side of the blocker 52 in the rotation-radial direction of the knob 24, enabling an effective reduction in the size of the shift device 10 to be achieved in the rotation-radial direction of the knob 24.

The rotating frame 50 of the shaft 44 is provided with the release face 50A, the second engagement face 50C, and the first engagement face 50B. The second inclined face 50E is provided between the release face 50A and the second engagement face 50C, and the first inclined face 50D is provided between the second engagement face 50C and the first engagement face 50B. The release face 50A, the second engagement face 50C, and the first engagement face 50B are at different positions to each other in both the circumferential rotation direction and the rotation axial direction of the shaft 44 (rotating frame 50). Accordingly, rotating the shaft 44 changes the engagement counterpart of the upper end face of the engagement plate 52C from the release face 50A to the second engagement face 50C or to the first engagement face 50B, thereby enabling the blocker 52 to be moved from the released position to the second movement position or the first movement position.

Moreover, the blocker 52 is biased by the lock spring 54. Biasing force is applied to the shaft 44, the worm gear 40, and the helical gear 42. This thereby enables rattling of the blocker 52, the shaft 44, the worm gear 40, and the helical gear 42 to be suppressed, and thereby enables operation noise from the blocker 52, the shaft 44, the worm gear 40, and the helical gear 42 to be reduced.

Second Exemplary Embodiment

Figure 9:
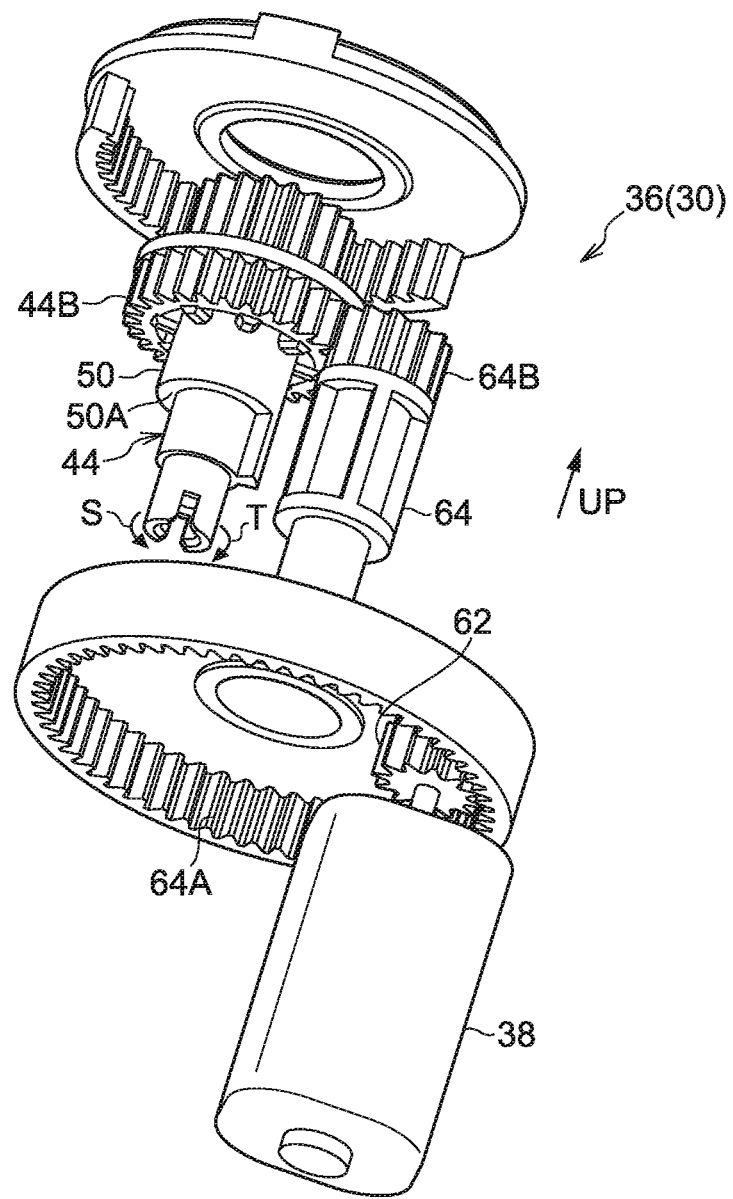
FIG. 9 is a perspective view from a lower side, illustrating a shift locking mechanism of a shift device according to a second exemplary embodiment of the present disclosure.

FIG. 9 is a perspective view illustrating relevant portions of a shift device 60 according to a second exemplary embodiment of the present disclosure, as viewed from a lower side.

The shift device 60 according to the present exemplary embodiment has substantially the same configuration as the first exemplary embodiment, but differs in the following respects.

As illustrated in FIG. 9, in the shift device 60 of the present exemplary embodiment, the axial direction (output shaft) of the motor 38 of the shift locking mechanism 36 is disposed parallel with the up-down direction. Instead of the worm gear 40 of the first exemplary embodiment, a shaft gear 62 (spur gear), serving as an initial gear, is fixed to the output shaft of the motor 38 so as to be coaxial to and capable of rotating as a unit together with the output shaft.

Instead of the helical gear 42 of the first exemplary embodiment, the shaft gear 62 is meshed with a first gear 64A (internal-toothed gear) of a gear shaft 64, serving as an intermediate gear. The first gear 64A is provided coaxial to and capable of rotating as a unit together with a lower end portion of the gear shaft 64. The gear shaft 64 is rotatably supported inside the case 12, and an axial direction of the gear shaft 64 is disposed parallel to the up-down direction. A second gear 64B (spur gear) is coaxially provided to an upper end portion of the gear shaft 64 so as to be capable of rotating as a unit together with the gear shaft 64. A diameter of the second gear 64B is smaller than the diameter of the first gear 64A.

A third gear 44B (spur gear) is provided coaxial to and capable of rotating as a unit together with an upper side of the rotating frame 50 in the vicinity of an upper end portion of the shaft 44. The third gear 44B is meshed with the second gear 64B of the gear shaft 64.

Accordingly, when the motor 38 is driven, rotating the shaft gear 62, the gear shaft 64 (including the first gear 64A and the second gear 64B) is rotated, and the shaft 44 (including the third gear 44B) is rotated. Accordingly, the upper end face of the engagement plate 52C of the blocker 52 moves to the release face 50A, the second inclined face 50E, the second engagement face 50C, the first inclined face 50D, and the first engagement face 50B of the rotating frame 50 of the shaft 44, thus moving the blocker 52 between the released position, the second movement position, and the first movement position.

The present exemplary embodiment is therefore capable of achieving similar operation and advantageous effects to those of the first exemplary embodiment described above.

Moreover, in the present exemplary embodiment, the shaft gear 62 and the gear shaft 64 are provided instead of the worm gear 40 and the helical gear 42 of the first exemplary embodiment. Accordingly, by setting a smaller speed reduction ratio for the rotation transmitted from the motor 38 to the shaft 44, the efficiency with which rotation is transmitted from the motor 38 to the shaft 44 can be raised, and the rotation speed of the shaft 44 can be increased, thereby enabling the movement speed of the blocker 52 to be increased.

Note that in the first exemplary embodiment and the second exemplary embodiment, the shift locking mechanism 36 locks rotation of the knob 24 at the P position and the N position. However, configuration may be made such that the shift locking mechanism 36 locks rotation of the knob 24 at a shift position other than the P position and the N position (for example, the R position or the D position).

Moreover, in the first exemplary embodiment and the second exemplary embodiment, the shift locking mechanism 36 locks rotation of the knob 24 to within the range from the N position to the D position. However, configuration may be made such that the shift locking mechanism 36 locks rotation of the knob 24 to within a range of plural shift positions other than the range from the N position to the D position (for example, a range from the R position to the D position).

Moreover, in the first exemplary embodiment and the second exemplary embodiment, the blocker 52 is moved from the released position to the first movement position and the second movement position. However, configuration may be made such that the blocker 52 is moved from the released position to one, or to three or more, movement positions.

Moreover, in the first exemplary embodiment and the second exemplary embodiment, the shift locking mechanism 36 is provided at a location at the case 12 and plate 14, and the blocker 52 (block 52A) of the shift locking mechanism 36 engages with the knob 24. However, configuration may be made such that the shift locking mechanism 36 is provided at the knob 24, and the blocker 52 (block 52A) of the shift locking mechanism 36 engages with portions at the case 12 and the plate 14.

Moreover, in the first exemplary embodiment and the second exemplary embodiment, the occupant rotation operates the knob 24. However, configuration may be made such that the knob 24 is provided with a lever (shift section) so as to be capable of rotating as a unit together with the lever, and the occupant swings the lever in order to rotate the knob 24.

Moreover, in the first exemplary embodiment and the second exemplary embodiment, the shift device 10, 60 is installed to the steering column cover. However, configuration may be made such that the shift device 10, 60 is installed to a floor of the vehicle cabin, an instrument panel, or a console.

What is claimed is:

1. A shift device for a vehicle, the shift device comprising:
   a shift body that is operated so as to be rotated and to change a shift position;
   a restriction member provided with a restriction portion, the restriction portion projecting in a rotation axial direction of the shift body, and the restriction member being moved only in the rotation axial direction of the shift body so as to restrict rotation of the shift body at the restriction portion;
   a magnet attached to the restriction member, and
   a detection board having two major opposing surfaces, the major surfaces of the detection board being disposed along the rotation axial direction of the shift body and detecting a position of the magnet in the rotation axial direction, wherein:
   a restricted slot, which extends in the rotation axial direction of the shift body, is formed at the shift body, and
   in a case in which the shift body is placed at a P position, the restriction portion is both insertable into the restricted slot of the shift body so that the restriction member is configured to be positioned at a restriction position such that rotation of the shift body from the P position is restricted, and releasable from the restricted slot so that the restricting member is configured to be positioned at a released position and so that the shift body is rotatable from the P position toward another shift position, and
   the detection board detects the restriction position and the released position, in the rotation axial direction of the shift body, of the magnet.

2. The shift device of claim 1, wherein the restriction member is moved to a plurality of movement positions.

3. The shift device of claim 1, the shift device further comprising a rotating member that is provided so as to move the restriction member, the restriction member engaging with the rotating member,
   wherein the rotating member is provided with a plurality of engagement portions, each of the plurality of engagement portions being disposed at a different position in a rotation circumferential direction and in a rotation axial direction of the rotating member, the restriction member being engageable with each of the plurality of engagement portions.

4. The shift device of claim 1, further comprising a biasing member applying a biasing force to the restriction member along the rotation axial direction of the shift body.

5. The shift device of claim 1, the shift device further comprising a rotating member that is provided so as to move the restriction member, the restriction member engaging with the rotating member,
   wherein:
   the restriction member is formed with an engaging portion that projects in a radial direction of the shift body, and
   the rotating member is formed with a plurality of engagement portions at which the engaging portion abuts either of the engagement portions.

6. The shift device of claim 1, wherein the detection board detects the shift position of the shift body.

7. The shift device of claim 1, the shift device further comprising a motor that is configured to rotate the shift body, wherein a rotation axial direction of the motor is disposed along the surface of the detection board.

8. The shift device of claim 1, further comprising a rotating member disposed directly beneath the shift body along the rotation axial direction of the shift body and engaging with the restriction member so as to move the restriction member.

9. The shift device of claim 1, further comprising a rotating member engaging with the restriction member so as to move the restriction member, the rotating member having an axis of rotation aligned with the rotation axial direction of the shift body and intersecting with the shift body.

10. A shift device for a vehicle, the shift device comprising:
    a shift body that is operated so as to be rotated and to change a shift position;
    a restriction member provided with a restriction portion, the restriction portion projecting in a rotation axial direction of the shift body, and the restriction member being moved only in the rotation axial direction of the shift body so as to restrict rotation of the shift body at the restriction portion;
    a magnet attached to the restriction member;
    a rotating member being disposed directly beneath the shift body along the rotation axial direction of the shift body and engaging with the restriction member so as to move the restriction member, and
    a detection board detecting a position of the magnet in the rotation axial direction, wherein:

a restricted slot, which extends in the rotation axial direction of the shift body, is formed at the shift body, and in a case in which the shift body is placed at a P position, the restriction portion is both insertable into the restricted slot of the shift body so that the restriction member is configured to be positioned at a restriction position such that rotation of the shift body from the P position is restricted, and releasable from the restricted slot so that the restricting member is configured to be positioned at a released position and so that the shift body is rotatable from the P position toward another shift position, and the detection board detects the restriction position and the released position, in the rotation axial direction of the shift body, of the magnet.

11. A shift device for a vehicle, the shift device comprising:

a shift body that is operated so as to be rotated and to change a shift position;

a restriction member provided with a restriction portion, the restriction portion projecting in a rotation axial direction of the shift body, and the restriction member being moved only in the rotation axial direction of the shift body so as to restrict rotation of the shift body at the restriction portion;

a magnet attached to the restriction member;

a rotating member engaging with the restriction member so as to move the restriction member, the rotating member having an axis of rotation aligned with the rotation axial direction of the shift body and intersecting with the shift body, and a detection board detecting a position of the magnet in the rotation axial direction, wherein:

a restricted slot, which extends in the rotation axial direction of the shift body, is formed at the shift body, and in a case in which the shift body is placed at a P position, the restriction portion is both insertable into the restricted slot of the shift body so that the restriction member is configured to be positioned at a restriction position such that rotation of the shift body from the P position is restricted, and releasable from the restricted slot so that the restricting member is configured to be positioned at a released position and so that the shift body is rotatable from the P position toward another shift position, and the detection board detects the restriction position and the released position, in the rotation axial direction of the shift body, of the magnet.

12. The shift device of claim 11, wherein the detection board has two major opposing surfaces, the major surfaces of the detection board being disposed along the rotation axial direction of the shift body and detecting a position of the magnet in the rotation axial direction.

* * * * *